US006926783B2

(12) United States Patent
Loucks, Jr.

(10) Patent No.: US 6,926,783 B2
(45) Date of Patent: Aug. 9, 2005

(54) MANUFACTURING PRECISION MULTIPOLE GUIDES AND FILTERS

(75) Inventor: Harvey D. Loucks, Jr., Palo Alto, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 172 days.

(21) Appl. No.: 10/127,040

(22) Filed: Apr. 19, 2002

(65) Prior Publication Data

US 2002/0117247 A1 Aug. 29, 2002

Related U.S. Application Data

(63) Continuation of application No. 09/524,126, filed on Mar. 13, 2000, now abandoned.

(51) Int. Cl.[7] .......................... B29C 65/54; H01J 1/88

(52) U.S. Cl. ...................... 156/73.6; 156/294; 156/305; 250/292

(58) Field of Search ............................ 156/73.6, 294, 156/305; 264/262, 261; 250/292

(56) References Cited

U.S. PATENT DOCUMENTS 3,699,300 A 10/1972 Buerki
3,793,063 A 2/1974 Wiley
4,213,557 A 7/1980 Franzen et al.
4,244,768 A * 1/1981 Wiechowski et al. ....... 156/293
4,673,455 A * 6/1987 May ........................... 156/294
4,700,069 A 10/1987 Ino et al.
4,804,389 A 2/1989 Johnston et al.
4,885,500 A 12/1989 Hansen et al.
4,960,991 A 10/1990 Goodley et al.
4,990,777 A 2/1991 Hurst et al.
5,251,276 A * 10/1993 Berkey et al. ................ 385/43
5,331,160 A 7/1994 Whitt
5,359,196 A 10/1994 Whitt
5,373,157 A 12/1994 Hiroki et al.
5,384,461 A 1/1995 Jullien et al.
5,389,785 A 2/1995 Steiner et al.
5,525,084 A 6/1996 Broadbent et al.
5,559,327 A 9/1996 Steiner
5,598,001 A 1/1997 Flory et al.
5,616,919 A 4/1997 Broadbent et al.
5,644,131 A 7/1997 Hansen
5,703,360 A 12/1997 Fischer et al.
5,708,268 A 1/1998 Franzen
5,726,447 A 3/1998 Aisawa et al.
5,750,988 A 5/1998 Apfel et al.
5,753,795 A 5/1998 Kuypers
5,753,910 A 5/1998 Gourley et al.
5,837,090 A * 11/1998 Binnie et al. ............... 156/294
5,838,003 A 11/1998 Bertsch et al.
5,852,270 A 12/1998 Holkeboer
5,852,294 A 12/1998 Gulcicek et al.
5,852,302 A 12/1998 Hiraishi et al.
5,868,322 A 2/1999 Loucks, Jr. et al.
5,872,357 A 2/1999 Flanagan
5,939,718 A 8/1999 Yamada et al.
5,942,752 A 8/1999 Wang
6,302,987 B1 * 10/2001 Wojnarowski et al. ...... 156/305

* cited by examiner

*Primary Examiner*—Steven D. Maki

(57) ABSTRACT

A method for manufacturing a multipole assembly for use in mass spectrometers, residual gas analyzers, mass filters, ion containment apparatus and particle beam accelerators. A precision mandrel tool is utilized for positioning a plurality of electrode rods in position during the manufacturing process. The electrode rods are placed on the mandrel. At least one insulator is positioned about the mandrel-rod assembly such that the mandrel-rod assembly psses through the insulator. The rods are tightly clamped to the mandrel and adhesive is placed in a gap established between each rod and the insulator. The adhesive is cured such that it acts both as a rigid bond between the insulator and each rod, as well as a precision spacer for positioning each rod in a precision position after the mandrel is removed from the assembly.

13 Claims, 6 Drawing Sheets

SECTION A–A

MANUFACTURING PRECISION MULTIPOLE GUIDES AND FILTERS

CROSS REFERENCE TO RELATED APPLICATION(S)

This is a continuation of copending application Ser. No. 09/524,126 filed on Mar. 13, 2000 now abandoned.

TECHNICAL FIELD OF THE INVENTION

The present invention relates to the manufacturing of multipole assemblies of various instruments. More particularly, the present invention relates to the manufacturing of multipole assemblies for scientific instruments including mass spectrometers, residual gas analyzers, mass filters, ion containment apparatus, particle beam accelerators and others.

DESCRIPTION OF RELATED ART

Scientific instruments such as mass spectrometers, residual gas analyzers, mass filters, ion containment apparatus and particle beam accelerators may be constructed using four, six, eight or twelve pole electrodes (rods) known as a quadrupoles, hexapoles, octopoles, and dodecapoles, respectively. Such devices require high precision manufacturing and placement of the poles. The accuracy of the scientific instrument is dependant, at least in part, on the precision placement of the poles and continuous alignment of the poles over the operating temperatures and life of the scientific instrument.

For example, a mass spectrometer which utilizes a mass filter is utilized to analyze the chemical composition of matter. Electric fields created in the mass filter separate ionized particles based on their mass-to-charge ratios. High filtering resolution is achieved using a quadrupole mass filter which includes four elongated electrodes or rods.

FIG. 1 depicts a generic quadrupole mass filter that includes four parallel metal elongated electrodes (rods) 100. Two opposite rods may have an applied potential of (U+V cos(wt)) and the other two rods may have an applied potential of (U−V cos(wt)), where V is a dc voltage and V cos (wt) is an ac voltage. The applied voltages affect the trajectory of ions traveling down the "flight path" centered between the four rods. For given dc and ac voltages, only ions of a certain mass-to-charge ratio pass through the quadrupole filter and all other ions of a certain mass-to-charge ratio pass through the quadrupole filter and all other ions are thrown out of their original path. A mass spectrum is obtained by monitoring the ions passing through the quadrupole filter as the voltages on the rods are varied. For example, there are two methods of varying the voltages (1) varying w and holding U and V constant, or (2) varying U and V (U/V) fixed for a constant w.

Still referring to FIG. 1 a quadrupole mass spectrometer generally comprises an ion source, ion optics to accelerate and focus the ions through an aperture into a quadrupole filter, the quadrupole filter itself with control voltage supplies an exit aperture, an ion detector and electronics, and a high-vacuum system.

The performance accuracy of a multiple mass filter is critically dependant on the mechanical accuracy of the individual poles (rods) and their relationship to each other. The symmetry and parallelism of the rods in the assembly effect the accuracy of the instrument. Prior art designs for a multipole mass filter have been to attempt to manufacture high precision rods, high precision insulators for the rods and then fasten them together and accept the resulting accuracy (or inaccuracy) of the final assembly. The manufacture of high precision parts is very expensive and time consuming. High precision parts and the manufacture thereof increases the overall cost and production time required of each scientific device utilizing such parts. Furthermore, assembly of multiple precision parts adds a degree of error to a finished product which depends on the interaction of the various several different parts. As such, production of highly accurate and/or acceptable manufacturing yields for high resolution mass spectrometry mass filters has not been a huge success.

What is needed is a method and/or tool for aiding the manufacture of a quadrupole, hexapole, octopole, or dodecapole mass filter such that lower precision parts can be utilized while the resulting symmetry and parallelism of the rods are not entirely dependant on the precision of the parts. Such a tool and method of manufacturing could produce higher resolution mass filters with high quality and high production yields at a lower overall cost per mass filter.

SUMMARY OF THE INVENTION

The exemplary embodiments of the present invention overcome the foregoing and other problems by providing a multipole filter which can be manufactured utilizing a precision mandrel tool which is used to accurately position the rod electrodes in a multipole assembly. The electrodes are placed on the precision mandrel tool and insulation rings are positioned about the electrode mandrel configuration. The insulation rings do not need to be high precision parts. The rods are clamped tightly against the precision mandrel such that they conform to the straight parallel rod positioning cradles that make up the mandrel's surface. The rods are held parallel to each other and positioned symmetrically about the mandrel's axis. A gap that exists between each electrode and the inner surface of the insulation rings is filled with an epoxy adhesive. The epoxy adhesive essentially performs two functions. First, the epoxy adhesive holds the electrode rods rigidly in place over the expected operating temperature range. Second the epoxy operates as a precision spacer which "takes up the slop" or inaccuracies associated with the manufacturing of the insulators. In other words, the epoxy accurately holds and positions the rods in the precision mandrel defined parallel and symmetrical positions.

Due to a non-requirement of at least high precision insulators the cost of parts manufacturing the resulting multipole assembly is decreased. Furthermore, the resulting multipole assembly may be more precise and have a high manufacturing yield than prior methods of manufacturing a multipole assembly.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS OF THE PRESENT INVENTION

Before the invention is described in detail, it should be understood that this invention is not limited to the exemplary embodiments or component parts of the quadruture mass filter and/or assembly depicted and described. Furthermore, the invention is not limited to the process steps of the methods described. Indeed, that which is described herein may also apply to assemblies having two, three, four, five, six or more poles, rods, or electrodes that must be positioned such that the symmetry and/or parallelism of the rods in the assembly is manufactured and maintained with mechanical accuracy. The preferred embodiments of the present invention have an even number of rods.

The present exemplary embodiment of the present invention provides a method of manufacturing utilizing a precision manufactured mandrel tool that accurately represents the inverse of the electrode surfaces which are to be assembled in the multipole mass filter. The mandrel tool is chosen because it can be molded and/or machined very accurately due to it being a monolithic part. Furthermore, since the mandrel is a tool which is to be utilized multiple, if not hundreds of times, it is economical to expend time, effort and expense to manufacture durable and accurately shaped mandrel.

Figure 1:
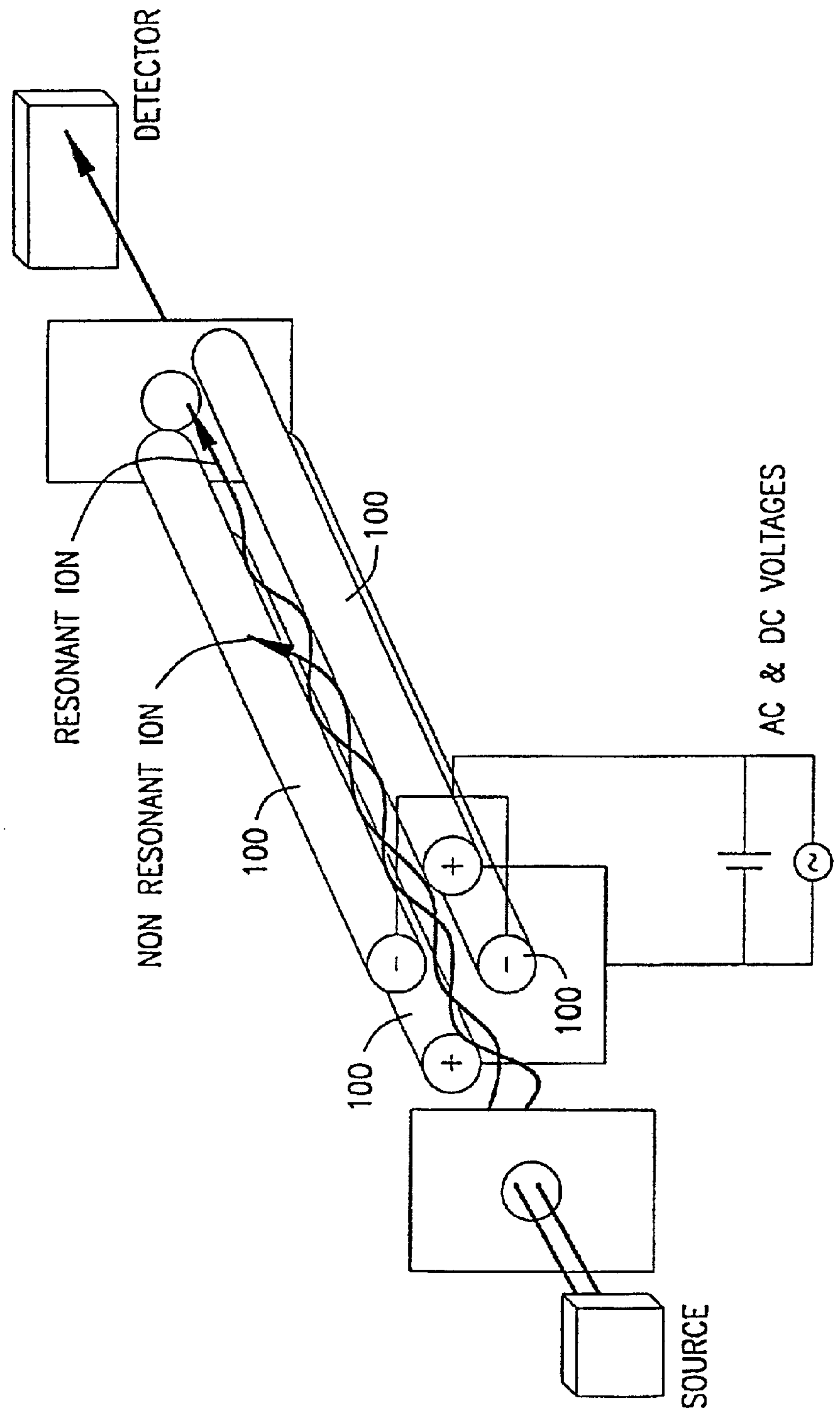
FIG. 1 (PRIOR ART)
FIG. 1 is a general drawing of a quadrupole mass filter.

Referring for a moment to FIG. 1, the four rods 100 must be positioned accurately within an assembly to ensure the final product's accuracy. The rods 100 ideally must be both symmetrical to each other with respect to size, shape and placement. The rods ideally should also be perfectly parallel with each other along their entire length.

Referring now to FIGS. 2 through 7, the exemplary method of manufacturing an exemplary quadruple mass filter is described.

Figure 2:
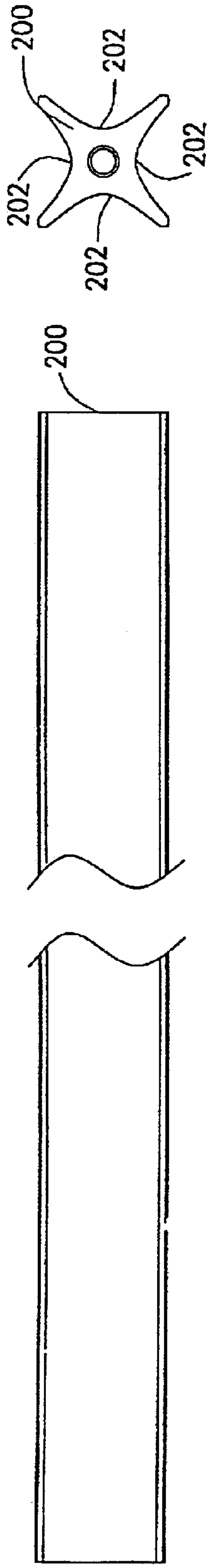
FIG. 2 depicts a top and side view of an exemplary alignment mandrel tool used in accordance with the present inventors.

FIG. 2 depicts a precision mandrel 200 in accordance with the present invention. The mandrel is at least the length of a rod (not shown) and is a tool that very accurately represents the inverse of the electrode rod surfaces that are required for the quadrupole assembly. The exemplary mandrel comprises four receiving surfaces 202. In a preferred embodiment, the receiving surfaces 202 are hyperbolic surfaces. Each hyperbolic surface being for receiving and positioning a rod (not shown) into place. The receiving surface could be round, parabolic, flat, triangular, have faceted flat surfaces, etc. Thus, it is understood that the exemplary hyperbolic surface could be any surface that properly receives and is substantially the inverse of the rod surface such that each rod can be cradled and/or held in place. The mandrel 200 is preferably made of fully hardened

A2 tool steel or any reasonable substitutes, facsimile, or derivation thereof.

Figure 3:
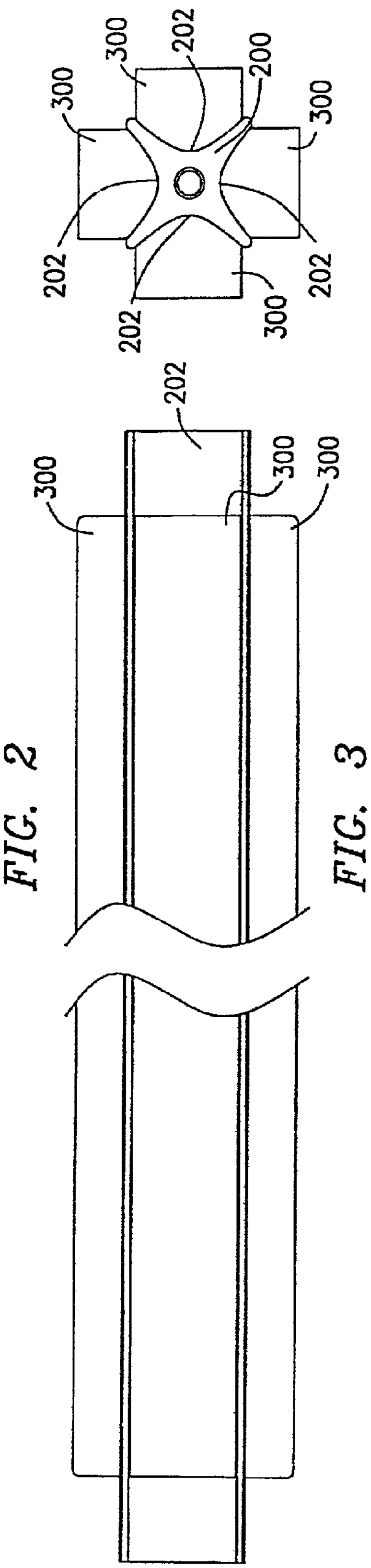
FIG. 3 depicts a top and side view of an exemplary mandrel and four exemplary rods in association with the mandrel in accordance with the manufacturing method of the present invention.

A first step of manufacturing an exemplary quadrupole mass filter is depicted in FIG. 3. The rods 300 are placed on the receiving surfaces 202 of the mandrel 200. The rods 300 may also be clamped (clamp not shown) to the receiving surfaces 202 of the mandrel 200. Prior to placement of the rods 300 on the mandrel 200 a thin coat of lubricant, such as WD-40 or a reasonable facsimile, may be applied to the mandrel 200 to aid its removal at the end of the process. The clamps insure that the rods conform to the mandrel. A preferred clamp is a C-shaped wire spring which is pulled open and clamps about the rod-mandrel structure. The clamp(s) clamp down on the back portion of the rods (the portion of the rod opposite the rod surface touching the mandrel). The rods 300 are positioned parallel to each other and symmetrical about the axis of the mandrel.

As discussed above, the rods are required to be extremely straight and parallel along their length. The straighter and more parallel the rods, the more precise the resulting mass filter will be. The clamping of the rods 300 against the mandrel may actually bend the rods 300 straight such that they conform to each respective receiving surface 202 of the mandrel 200.

Figure 4:
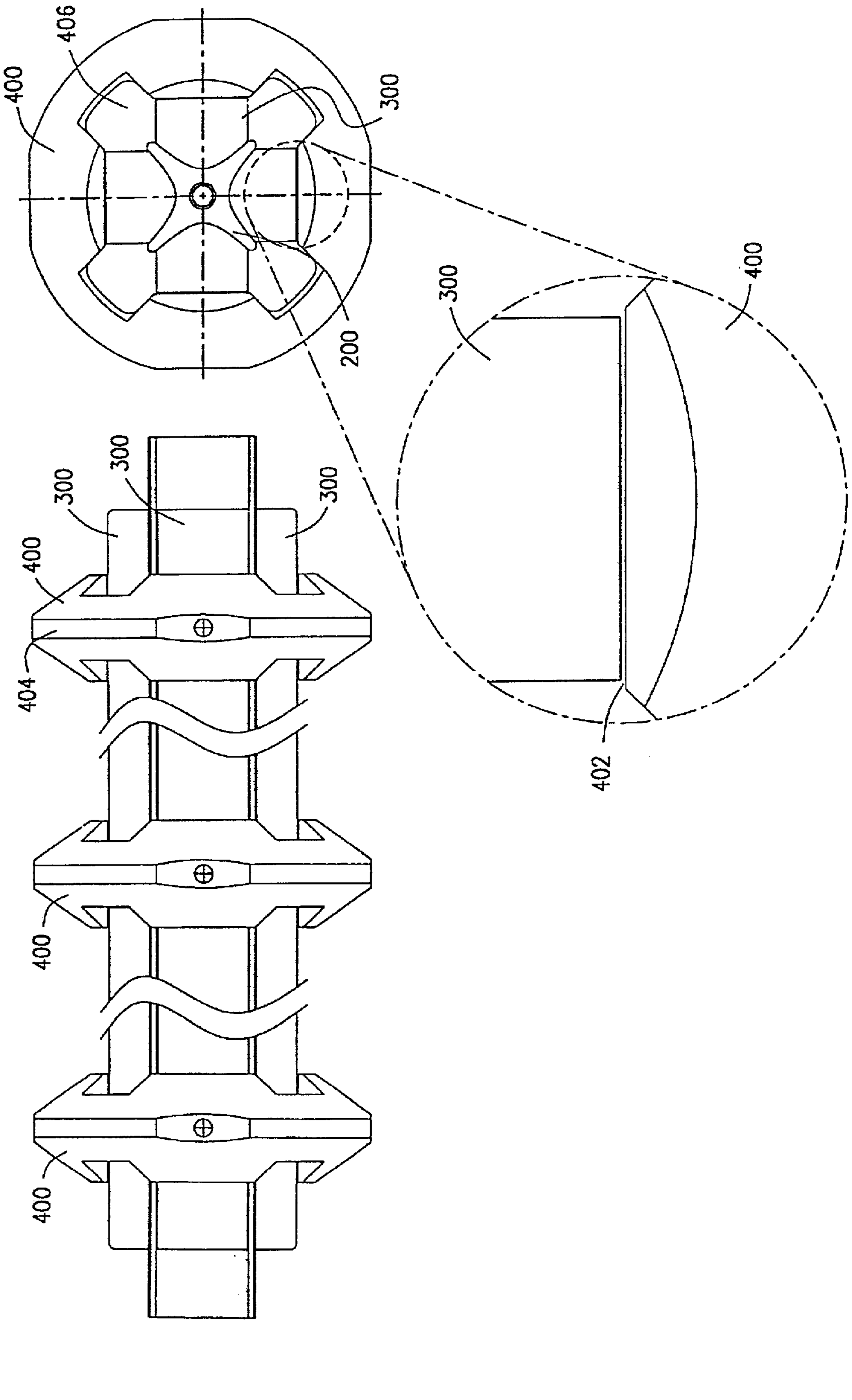
FIG. 4 depicts a top, side and blown-up view of an exemplary mandrel, four exemplary rods and a plurality of insulator rings positioned in accordance with the manufacturing method of the present invention.
Figure 5:
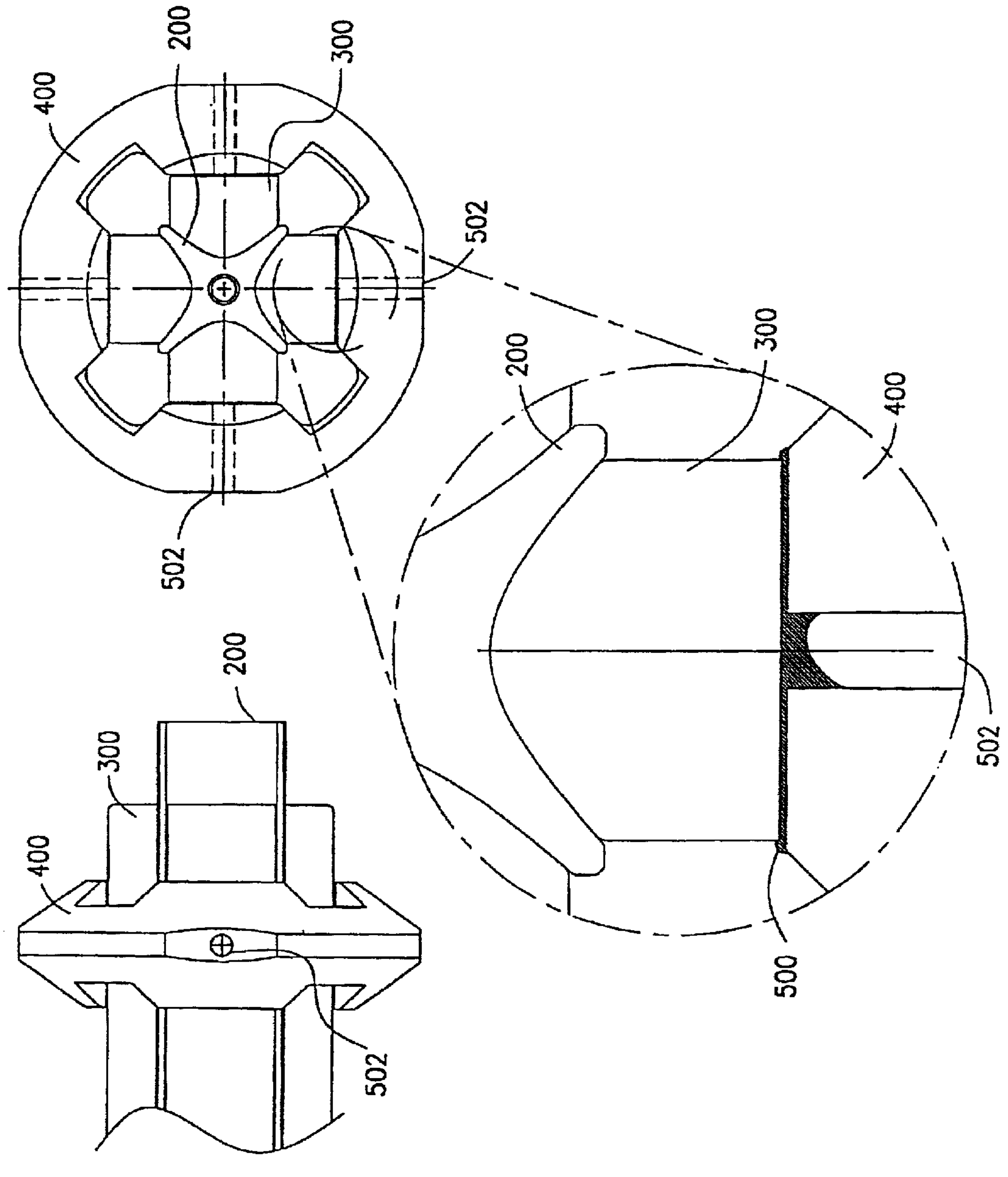
FIG. 5 depicts a side, top and exploded view of an exemplary mandrel, rod, epoxy, insulator ring configuration in accordance with the manufacturing method of the present invention.

The next major steps, depicted in FIG. 4, requires positioning at least one, and preferably a plurality of insulators 400 over the rod-mandrel assembly. The insulators 400 are preferably made of a ceramic material. In particular, the preferred ceramic material is an aluminum oxide type of ceramic, but different types of insulating materials may be utilized in different systems. Carbide, silicon, and nitrate based materials could be utilized in the ceramic material. Furthermore, zirconium oxide or alloys of magnesium zirconium could also be used. Generally, the insulators 400 are going to be made of a type of metal oxide and operate as electrical insulators.

The insulators 400 are depicted as having an outer surface that is roundish with a machine hole or void through its center. The shape of the outer surface 404 could be squared, triangularish or substantially any shape required or necessary so that the resulting mass filter can be assembled into a finished product.

Furthermore, the hole or void 406 through the insulator 400 is defined by an inner surface of the insulator 400. Parts of the inner surface of the insulator may contact or be directly adjacent to the rods 300 and parts of the inner surface will not touch or be directly adjacent to the rods 300.

In the exemplary embodiments, it is important to note that the insulators 400 do not need to be precision parts. A gap 402 exists between the rod surface that is adjacent to the insulator 400. The gap 402 is an adhesive-joint-gap for the application of adhesives (to be explained below) and need not be a precision tight fit with a rod 300. The insulator 400 are for electrically insulating the rods 300 from each other in the completed and operating mass filter, but during manufacture, the insulators 400 help to hold the rods 300 in position until they are frozen in place during the curing process (discussed below). Since the insulators 400 do not need to be precision parts, the cost of manufacturing the resulting mass filter is greatly reduced.

The rods 300 can be clamped to the mandrel after the insulators 400 are in place. In fact, the rods may be partially clamped prior to placement of the insulators, and completely clamped after the placement of the insulators.

The next step is to apply an epoxy adhesive 500 to the gaps 402 between the insulators 400 and the rods 300. FIG.

5 depicts the gap 402 and the adhesive 500 being applied through a filling hold 502.

The adhesive 500 is preferably a high temperature epoxy such as HT375 made by Epoxy Technology. The preferable epoxy is very hard when cured. The epoxy should have a high glass transition point that is above the expected operating temperature range of the completed mass filter instrument. The epoxy preferably should also produce a relatively low amount of out gas. The preferred epoxy, when cured will enable less than 2 microns of movement when stressed at operating temperature, preferably less than one micron of movement. (i.e. the rods will move less than one micron due to the epoxy over the operating temperature range).

The epoxy adhesive 500 fills the gap 402 such that the imprecision or "slop" space or distance between the insulator 400 and the rod 300 is accounted for by the epoxy adhesive 500. The epoxy in effect becomes a precision spacer.

The next step is a curing process for the epoxy adhesive. It is important that during the curing process the adhesive does not creep, shrink and/or otherwise move the rod 300 from being accurately positioned against the mandrel 200. The combination of the epoxy adhesive 500 and the precision mandrel 200 replace the prior necessity for requiring that every part associated with placement of the rods 300 be a very high precision part. Thus, manufacturing costs are saved while precision of the resulting device is increased. The cured epoxy adhesive 500 provides a ridged connection between the rods 300 and insulators 400 that constrains the rods 300 to the position dictated by the precision mandrel 200. The cured epoxy adhesive acts as both an adhesive and a precision spacer.

Before curing the adhesive 500 an additional assembly step involving applying a shock wave may be performed. This step involves "tapping" the mandrel 200 axially. The tapping can be performed with a hammer, or by impacting an end of the mandrel against a hard surface. The acoustic impulse of the tapping substantially eliminates the friction temporarily between the mandrel 200 and the rods 300. The rods 300 can slide to a lowest potential energy position under the force of the clamping pressure.

The curing processes is preferably a two stage process. The curing process is a time and temperature process that will fully cure and "cross-link" (polymerize) the adhesive 500. The curing process includes heating the adhesive to a first temperature to allow the adhesive to be partially cured and heating the adhesive gradually to a second temperature. The curing process starts at substantially an acceptable room temperature (substantially 30° C.). In the first stage, the mandrel-rod-insulator assembly is then quickly heated to 60° C. The ramping is done in less than 10 minutes and preferably in about one minute. The assembly dwells at 60° C. for about 80 minutes. The second stage requires that after the 80 minute dwell time the temperature is increased 30° C. per minute until it reaches 100° C. Once at 100° C. the temperature remains constant for about two hours. After the two hours at 100° C., the temperature is decreased 5° C. per minute until it reaches 30° C. wherein the curing process is complete.

During the curing process of the adhesive 500, the adhesive shrinks. Prior to the present exemplary two stage curing process, the temperature was increased to a single temperature level where the adhesive was cured and then the temperature was brought back down. It was discovered that the epoxy shrinkage during polymerization at the single temperature created an extremely strong pull on the rods. The pull was so strong that the rods were pulled away from the mandrel in the area local to the epoxy joint causing errors of symmetry and parallelism.

The present exemplary two stage curing process requires that the temperature is increased to a first temperature (60° C.) for about 80 minutes to allow the epoxy adhesive to start to polymerize or "set-up". At the 80 minute point the epoxy is between about 80 and 98 percent cross-linked or polymerized. Furthermore, at 60° C. the temperature of the epoxy adhesive is above the glass transition point thus the epoxy is still rather elastic or rubbery in this first stage.

The second stage of the curing process requires increasing the temperature to 100° C. in a stepped fashion. As stated above, the epoxy adhesive will shrink a bit. The rods 300 and insulators 400 will also expand slightly as the temperature increases. As the rods 300 and the insulators 400 expand, the gap 402 size will decrease. The gap size decrease, due to the increase of temperature, is designed to substantially and closely offset the epoxy adhesive shrinkage. The thermal expansion of the rods and insulators compensate for the shrinkage of the curing adhesive. This is done so that the epoxy adhesive 500 does not pull any of the rods 300 away from the mandrel. The curing process continues at the higher temperature. There is no more shrinkage of the epoxy adhesive because most of it occurred at lower temperatures where the vast majority of curing, polymerization and/or cross linking of the epoxy took place. Furthermore, the glass transition temperature of the curing epoxy adhesive continues to rise while dwelling at 100° C.

The materials used for the multipole electrodes and the insulators are preferably chosen such that the critical dimension of the inside distance between opposing electrodes is held nearly constant as the temperature of the assembly changes. This is achieved by choosing a material having a lower expansion coefficient for the insulator material than for the electrode material. This selection allows the larger insulator to expand thermally at substantially the same rate as the smaller electrodes thermally expand in the opposite direction.

The mandrel-rod-insulator assembly is then cooled to a temperature below the glass transition temperature of the epoxy adhesive 500. The glass transition temperature may also be known as the glass transformation or plastic transformation temperature. The glass transition temperature is the temperature wherein various properties change in the exemplary adhesive 500. When below the glass transition temperature, the cured epoxy adhesive is very rigid so that the rods 300 do not move or creep during the life of the resulting mass filter device. It is preferable that the glass transition temperature of the epoxy adhesive be above the operating temperature of the resulting mass filter device.

The result of utilizing the precision mandrel 200 with the prescribed manufacturing process is a mass filter or multipole assembly having a cured adhesive which rigidly bonds the rods 300 and the insulators 400 so that the rods are constrained to the position dictated by the precision mandrel 200. The cured adhesive operators as both an adhesive bond and a precision spacer between the insulator and the rods.

Figure 6:
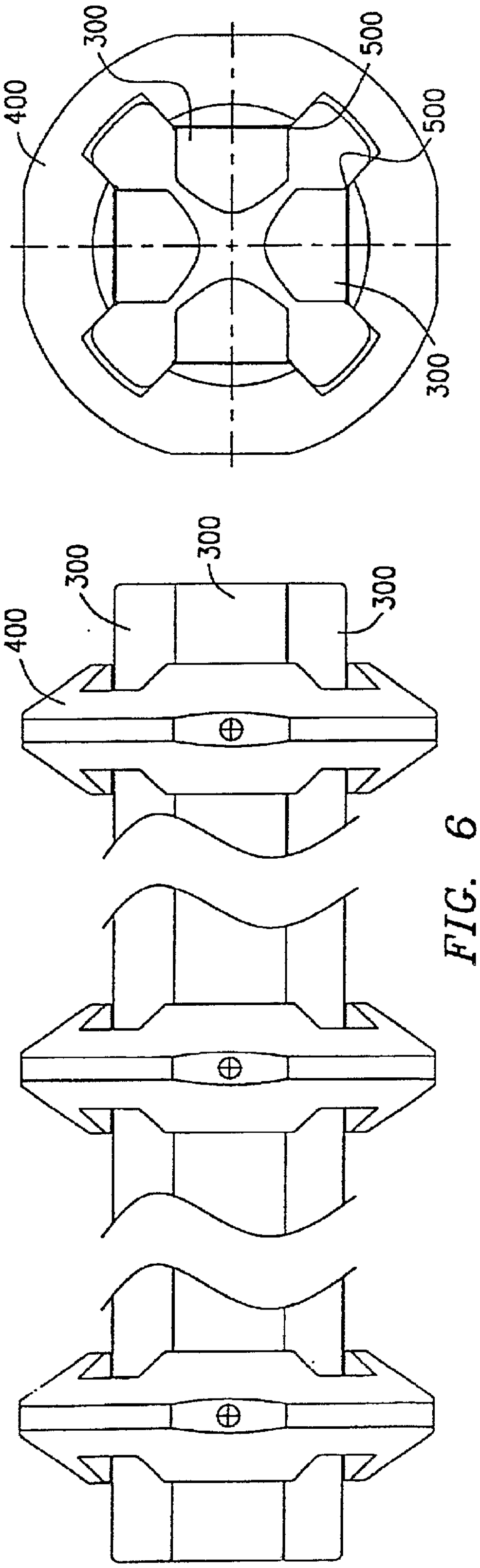
FIG. 6 is a side view of an exemplary completed quadrupole assembly in accordance with the present invention.
Figure 7:
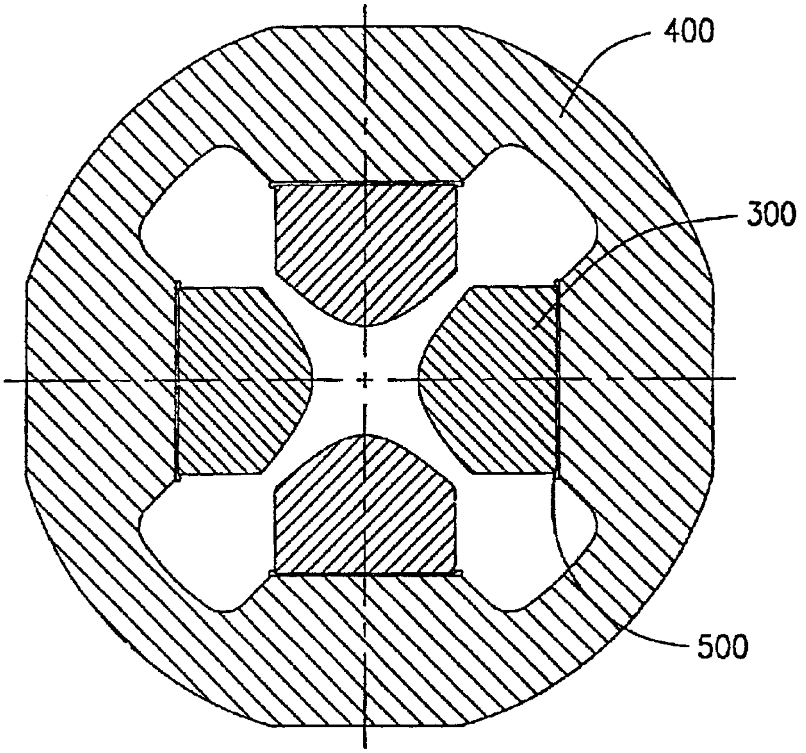
FIG. 7 is a top and partial side view of an exemplary completed quadrupole assembly constructed in accordance with the present invention.
Figure 7:
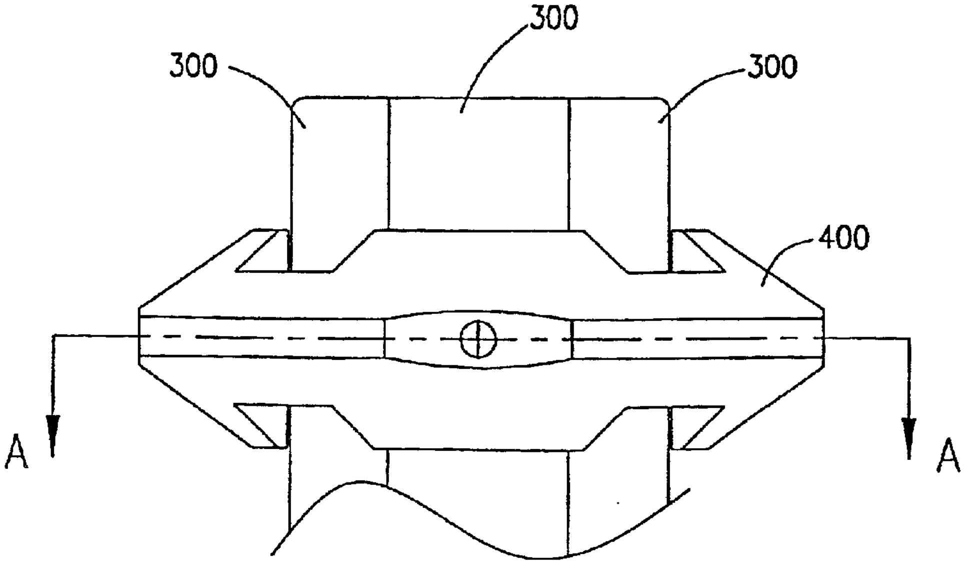

After the curing process the clamps are removed. The precision mandrel must also be removed. The mandrel-rod-insulator assembly can be cooled to a temperature such that the mandrel 200 thermally contracts or shrinks while the distance between opposing inner surfaces of the rods thermally expands or increases slightly. As a result the precision mandrel 200 can be slid out of its position. FIGS. 6 and 7 depict the resulting exemplary quadrupole mass filter assembly without the precision mandrel in accordance with the present invention.

Figure 8:
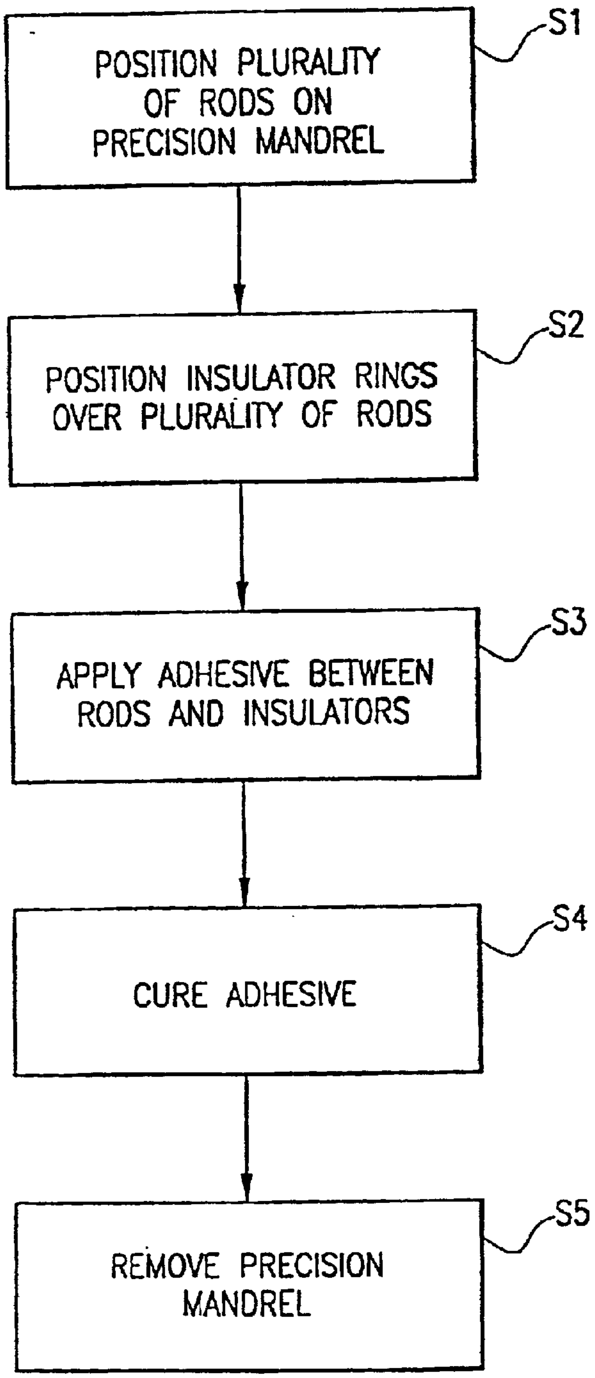
FIG. 8 is a flow diagram showing an embodiment of the invention.

FIG. 8 summarizes the manufacturing process in accordance with the present invention. Step S1 requires that a plurality of rods are positioned on the precision mandrel. In step S2 the insulator rings are positioned about the rods. Clamps may be applied around the rods in either steps S1 or S2. In step S3 adhesive is applied to fill the gap between the rods and their associated insulators. In step S4, the adhesive is cured in such a fashion that the rods are not moved from their position in the precision mandrel. In step S5, the precision mandrel is removed from the assembly and a resulting mass filter is provided having extremely accurate symmetry and parallelism between the rods.

It is understood that while the invention has been described above in conjunction with preferred exemplary embodiments, the description and examples are intended to illustrate and not limit the slope of the invention. For example, the mandrel can be designed to hold two, four, six, eight or more rods. The mandrel can be designed to hold an odd number of rods as well. The rods can have various cross-sectional shapes. The surfaces and gap created between the rods and the inner surface of the insulator may be non-planar. Thus, the scope of the invention should only be limited by the following claims.

What is claimed is:

1. A method for manufacturing a multipole guide having rods and insulators positioned and aligned about a mandrel, comprising:

a) aligning and positioning the rods and the insulators precisely about the mandrel;

b) applying an adhesive which shrinks as it cures, to gaps between the insulators and rods;

c) heating the adhesive to a defined temperature and maintaining the defined temperature for a defined period of time to partially cure the adhesive;

d) heating the adhesive in a stepped fashion to a second defined temperature and maintaining the second defined temperature for a second defined period of time to complete curing of the adhesive; and e) cooling the adhesive and fixing the rods and insulators in their precisely aligned positions.

2. A method for manufacturing a multipole guide having rods and insulators positioned and aligned about a mandrel, comprising:

a) aligning and positioning the rods and the insulators precisely about the mandrel;

b) applying an adhesive to gaps between the insulators and rods;

c) heating the rods and insulators with thus adhesive to a defined temperature to cure the adhesive so that the shrinkage of the adhesive is equivalent to the thermal expansion of the rods and insulators to maintain the rods in precise alignment with the mandrel until the rods are fixed to the insulator; and d) cooling the adhesive and fixing the rods and insulators in their precisely aligned positions.

3. A method of manufacturing a multipole ion guide for scientific instruments comprising the steps of:

(a) providing an elongated mandrel that has a central longitudinal axis and a plurality of receiving surfaces that are evenly spaced about said longitudinal axis and are at the same distance from said axis so that said receiving surfaces are parallel to said axis;

(b) placing an electrically conductive rod at each of said receiving surfaces to produce a rod assembly;

(c) providing at least one insulator of an electrically insulating material, said insulator having an inner surface that defines a void;

(d) inserting said rod assembly into the void of said insulator so that each of said electrically conductive rods is between said longitudinal axis and said inner surface and spaced from said inner surface;

(e) applying a fluid adhesive which is curable to a rigid state in the spaces between said rods and said inner surface to form said multipole ion guide;

(f) applying a shock wave to said rod assembly after said insulator has been applied to said rod assembly and before said adhesive has been cured;

(g) curing said adhesive from a fluid state to a solid state; and (h) removing said multipole ion guide from said mandrel.

4. The method of claim 3, wherein said ion guide comprises a quadrupole mass filter.

5. A method of manufacturing a multipole ion guide for scientific instruments, comprising:

(a) providing an elongated mandrel that has a central longitudinal axis and a plurality of receiving surfaces that are evenly spaced about said longitudinal axis and are at the same distance from said axis so that said receiving surfaces are parallel to said axis:

(b) placing an electrically conductive rod at each of said receiving surfaces to produce a rod assembly;

(c) providing at least one insulator of an electrically insulating material, said insulator having an inner surface that defines a void;

(d) inserting said rod assembly into the void of said insulator so that each of said electrically conductive rods is between said longitudinal axis and said inner surface and spaced from said inner surface;

(e) applying a fluid adhesive which is curable to a rigid state in the spaces between said rods and said inner surface to form said multipole ion guide;

(f) curing said adhesive from a fluid state to a solid state, said adhesive being curable when heated above a specific temperature, which is above room temperature, said adhesive, when at least substantially cured, having a glass transition temperature point and shrinking during curing or said adhesive, said adhesive being rigid at a temperature below said glass transition temperature point and being elastomeric at a temperature above said glass transition temperature point, said rods and said insulator being made of materials that have thermal expansion coefficients that cause the spaces between said insulator and each of said rods to decrease by a value that is equivalent to the shrinkage of said adhesive during the curing step of said adhesive, said step of curing said adhesive comprising:

(1) heating said adhesive to a first temperature which is above said specific temperature and above said glass transition temperature point;

(2) maintaining said adhesive at said first temperature for a first predetermined time period;

(3) gradually increasing the temperature of said adhesive until said adhesive reaches a second temperature;

(4) maintaining said adhesive at said second temperature for a second predetermined time period; and (5) gradually decreasing the temperature of said adhesive from said second temperature to said room temperature; and (g) removing said multipole ion guide from said mandrel.

6. The method of claim 5, wherein said ion guide comprises a quadrupole mass filter.

7. A method of manufacturing a multipole assembly having a plurality of electrically conductive rods connected to an insulator for use as a multipole ion guide, comprising:

(a) positioning the rods about a mandrel so that the rods are aligned precisely relative to the mandrel;

(b) positioning the insulator relative to the rods so that there is a gap between each of the rods and the insulator;

(c) applying an adhesive to said gaps to form said multipole assembly, said adhesive being curable when heated above a specific temperature that is above room temperature and shrinks as it cures;

(d) heating said assembly to above said specific temperature to cure said adhesive so that the shrinkage of said adhesive is equivalent to the thermal expansion of said rods and insulators to maintain said rods in precise alignment with said mandrel until said rods are fixed to said insulator;

(e) decreasing the temperature of said assembly to said room temperature; and (f) removing said assembly from said mandrel.

8. The method as recited in claim 7, wherein said adhesive is an epoxy.

9. The method as recited in claim wherein 7, wherein the step of heating said assembly comprises:

(a) healing said assembly to a first temperature which is above said specific temperature;

(b) maintaining said assembly at said first temperature for a first predetermined time period to partially cure said adhesive;

(c) heating said assembly to a second temperature that is substantially above said first temperature; and (d) maintaining said assembly at said second temperature for a second predetermined time period to complete the curing of said adhesive.

10. The method as recited in claim 7, wherein said insulator is made of a material that has a lower thermal expansion coefficient than the thermal expansion coefficient of the material of said rods so that said inner surface moves toward said rods at the same rate as said rods expand toward said inner surface.

11. The method of claim 7, wherein said ion guide comprises a quadrupole mass filter.

12. A method of manufacturing a multipole assembly having a plurality of electrically conductive rods connected to an insulator for use as a multipole ion guide, comprising:

(a) positioning the rods about a mandrel so that the rods are aligned precisely relative to the mandrel;

(b) positioning the insulator relative to the rods so that there is a gap between each of the rods and the insulator;

(c) applying an adhesive to said gaps to form said multipole assembly, said adhesive being curable when heated above a specific temperature that is above room temperature;

(d) heating said assembly to a first temperature that is above said room temperature and maintaining the first temperature for a first period of time to partially cure the adhesive;

(e) healing said assembly in a stepped fashion to a second temperature that is above said first temperature and maintaining the second temperature for a second period of time to complete the curing of said adhesive so that the rods and insulator are in their precisely aligned positions;

(f) decreasing the temperature of said multipole assembly to said room temperature; and (g) removing said assembly from said mandrel.

13. The method of claim 12, wherein said ion guide comprises a quadrupole mass filter.

* * * * *

UNITED STATES PATENT AND TRADEMARK OFFICE

CERTIFICATE OF CORRECTION

PATENT NO. : 6,926,783 B2
DATED : August 9, 2005
INVENTOR(S) : Loucks Jr.

It is certified that error appears in the above-identified patent and that said Letters Patent is hereby corrected as shown below:

Title page,
Item [56], References Cited, U.S. PATENT DOCUMENTS, "5,750,988" reference, delete "Apfel" insert -- Apffel --.
Item [57], ABSTRACT,
Line 8, delete "psses" insert -- passes --.

Column 7,
Line 32, after "adhesive" insert -- , --.
Line 51, delete "thus" and insert -- the --.

Column 8,
Line 27, after "axis" delete ":" and insert -- ; --.
Line 47, delete "or" and insert -- of --.

Column 9,
Line 33, delete "healing" and insert -- heating --.

Column 10,
Line 28, delete "healing" and insert -- heating --.

Signed and Sealed this

Seventh Day of February, 2006

JON W. DUDAS
*Director of the United States Patent and Trademark Office*